(12) United States Patent
Wang et al.

(10) Patent No.: US 7,162,633 B2
(45) Date of Patent: Jan. 9, 2007

(54) METHOD AND APPARATUS FOR HIERARCHICAL ASSIGNMENT OF RIGHTS TO DOCUMENTS AND DOCUMENTS HAVING SUCH RIGHTS

(75) Inventors: Xin Wang, Torrance, CA (US); Aram Nahidipour, Laguna Niguel, CA (US); Michael C Raley, Downey, CA (US); Guillermo Lao, Torrance, CA (US); Thanh T. Ta, Huntington Beach, CA (US); Bijan Tadayon, Potomac, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 8 days.

(21) Appl. No.: 11/111,853

(22) Filed: Apr. 22, 2005

(65) Prior Publication Data

US 2005/0187877 A1 Aug. 25, 2005

Related U.S. Application Data

(63) Continuation of application No. 09/867,748, filed on May 31, 2001, now Pat. No. 6,895,503.

(51) Int. Cl.
*H04L 9/00* (2006.01)
(52) U.S. Cl. ........................ 713/168; 713/182; 713/193
(58) Field of Classification Search ................ 713/168, 713/182, 193
See application file for complete search history.

(56) References Cited

U.S. PATENT DOCUMENTS

| | | |
|---|---|---|
| 3,263,158 A | 7/1966 | Bargen |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |

(Continued)

FOREIGN PATENT DOCUMENTS

EP 0 084 441 7/1983

(Continued)

OTHER PUBLICATIONS

"National Semiconductor and EPR Partner for Information Metering/Data Security Cards" Mar. 4, 1994, Press Release from Electronic Publishing Resources, Inc.

(Continued)

*Primary Examiner*—Thomas R. Peeso
(74) *Attorney, Agent, or Firm*—Marc S. Kaufman; Carlos R. Villamar; Nixon Peabody, LLP

(57) ABSTRACT

A method, system and device for transferring usage rights associated with digital works, including generating, by a first party, first usage rights and hierarchical rights for a digital work, the first usage rights defining a use for the digital works, the first hierarchical rights specifying rights to derive usage rights or other hierarchical rights; presenting the first usage rights and hierarchical rights to a second party; receiving a selection from the second party indicating desired rights of the first usage rights and hierarchical rights; and granting the desired rights of the first usage rights and hierarchical rights to the second party.

68 Claims, 5 Drawing Sheets

U.S. PATENT DOCUMENTS

| | | | |
|---|---|---|---|
| 4,658,093 A | 4/1987 | Hellman | |
| 4,713,753 A | 12/1987 | Beobert et al. | |
| 4,796,220 A | 1/1989 | Wolfe | |
| 4,817,140 A | 3/1989 | Chandra et al. | |
| 4,827,508 A | 5/1989 | Shear | |
| 4,868,376 A | 9/1989 | Lessin et al. | |
| 4,891,838 A | 1/1990 | Faber | |
| 4,924,378 A | 5/1990 | Hershey et al. | |
| 4,932,054 A | 6/1990 | Chou et al. | |
| 4,937,863 A | 6/1990 | Robert et al. | |
| 4,949,187 A | 8/1990 | Cohen | |
| 4,953,209 A | 8/1990 | Ryder, Sr. et al. | |
| 4,961,142 A | 10/1990 | Elliott et al. | |
| 4,975,647 A | 12/1990 | Downer et al. | |
| 4,977,594 A | 12/1990 | Shear | |
| 4,999,806 A | 3/1991 | Chernow et al. | |
| 5,010,571 A | 4/1991 | Katznelson | |
| 5,014,234 A | 5/1991 | Edwards, Jr. | |
| 5,023,907 A | 6/1991 | Johnson et al. | |
| 5,047,928 A | 9/1991 | Wiedemer | |
| 5,050,213 A | 9/1991 | Shear | |
| 5,052,040 A | 9/1991 | Preston et al. | |
| 5,058,164 A | 10/1991 | Elmer et al. | |
| 5,103,476 A | 4/1992 | Waite et al. | |
| 5,113,519 A | 5/1992 | Johnson et al. | |
| 5,136,643 A | 8/1992 | Fischer | |
| 5,138,712 A | 8/1992 | Corbin | |
| 5,146,499 A | 9/1992 | Geffrotin | |
| 5,148,481 A | 9/1992 | Abraham et al. | |
| 5,159,182 A | 10/1992 | Eisele | |
| 5,183,404 A | 2/1993 | Aldous et al. | |
| 5,191,193 A | 3/1993 | Le Roux | |
| 5,204,897 A | 4/1993 | Wyman | |
| 5,222,134 A | 6/1993 | Waite et al. | |
| 5,235,642 A | 8/1993 | Wobber et al. | |
| 5,247,575 A | 9/1993 | Sprague et al. | |
| 5,255,106 A | 10/1993 | Castro | |
| 5,260,999 A | 11/1993 | Wyman | |
| 5,263,157 A | 11/1993 | Janis | |
| 5,263,158 A | 11/1993 | Janis | |
| 5,276,444 A | 1/1994 | McNair | |
| 5,276,735 A | 1/1994 | Boebert et al. | |
| 5,291,596 A | 3/1994 | Mita | |
| 5,301,231 A | 4/1994 | Abraham et al. | |
| 5,311,591 A | 5/1994 | Fischer | |
| 5,319,705 A | 6/1994 | Halter et al. | |
| 5,337,357 A | 8/1994 | Chou et al. | |
| 5,339,091 A | 8/1994 | Yamazaki et al. | |
| 5,341,429 A | 8/1994 | Stringer et al. | |
| 5,347,579 A | 9/1994 | Blandford | |
| 5,381,526 A | 1/1995 | Ellson | |
| 5,394,469 A | 2/1995 | Nagel et al. | |
| 5,410,598 A | 4/1995 | Shear | |
| 5,412,717 A | 5/1995 | Fischer | |
| 5,428,606 A | 6/1995 | Moskowitz | |
| 5,432,849 A | 7/1995 | Johnson et al. | |
| 5,438,508 A | 8/1995 | Wyman | |
| 5,444,779 A | 8/1995 | Daniele | |
| 5,453,601 A | 9/1995 | Rosen | |
| 5,455,953 A | 10/1995 | Russell | |
| 5,457,746 A | 10/1995 | Dolphin | |
| 5,473,687 A | 12/1995 | Lipscomb et al. | |
| 5,473,692 A | 12/1995 | Davis | |
| 5,499,298 A | 3/1996 | Narasimhalu et al. | |
| 5,502,766 A | 3/1996 | Boebert et al. | |
| 5,504,814 A | 4/1996 | Miyahara | |
| 5,504,818 A | 4/1996 | Okano | |
| 5,504,837 A | 4/1996 | Griffeth et al. | |
| 5,509,070 A | 4/1996 | Schull | |
| 5,530,235 A | 6/1996 | Stefik et al. | |
| 5,532,920 A | 7/1996 | Hartrick et al. | |
| 5,534,975 A | 7/1996 | Stefik et al. | |
| 5,539,735 A | 7/1996 | Moskowitz | |
| 5,563,946 A | 10/1996 | Cooper et al. | |
| 5,568,552 A | 10/1996 | Davis | |
| 5,621,797 A | 4/1997 | Rosen | |
| 5,629,980 A | 5/1997 | Stefik et al. | |
| 5,633,932 A | 5/1997 | Davis et al. | |
| 5,634,012 A | 5/1997 | Stefik et al. | |
| 5,638,443 A | 6/1997 | Stefik et al. | |
| 5,646,992 A | 7/1997 | Subler et al. | |
| 5,649,013 A | 7/1997 | Stuckey et al. | |
| 5,655,077 A | 8/1997 | Jones et al. | |
| 5,708,717 A | 1/1998 | Alasia | |
| 5,715,403 A | 2/1998 | Stefik | |
| 5,734,823 A | 3/1998 | Saigh et al. | |
| 5,734,891 A | 3/1998 | Saigh | |
| 5,737,413 A | 4/1998 | Akiyama et al. | |
| 5,737,416 A | 4/1998 | Cooper et al. | |
| 5,745,569 A | 4/1998 | Moskowitz et al. | |
| 5,748,783 A | 5/1998 | Rhoads | |
| 5,757,907 A | 5/1998 | Cooper et al. | |
| 5,761,686 A | 6/1998 | Bloomberg | |
| 5,765,152 A | 6/1998 | Erickson | |
| 5,768,426 A | 6/1998 | Rhoads | |
| 5,825,892 A | 10/1998 | Braudaway et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,949,876 A | 9/1999 | Ginter et al. | |
| 5,978,484 A | 11/1999 | Apperson et al. | |
| 5,982,891 A | 11/1999 | Ginter et al. | |
| 5,991,877 A | 11/1999 | Luckenbaugh | |
| 5,999,949 A | 12/1999 | Crandall | |
| 6,047,067 A | 4/2000 | Rosen | |
| 6,112,181 A | 8/2000 | Shear et al. | |
| 6,115,471 A | 9/2000 | Oki et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,226,618 B1 | 5/2001 | Downs et al. | |
| 6,233,684 B1 | 5/2001 | Stefik et al. | |
| 6,237,786 B1 | 5/2001 | Ginter et al. | |
| 6,240,185 B1 | 5/2001 | Van Wie et al. | |
| 6,266,618 B1 | 5/2001 | Downis et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,327,652 B1 | 12/2001 | England et al. | |
| 6,330,670 B1 | 12/2001 | England et al. | |
| 6,345,256 B1 | 2/2002 | Milsted et al. | |
| 6,363,488 B1 | 3/2002 | Ginter et al. | |
| 6,389,402 B1 | 5/2002 | Ginter et al. | |
| 2001/0000541 A1 | 4/2001 | Schreiber et al. | |

FOREIGN PATENT DOCUMENTS

| | | |
|---|---|---|
| EP | 0 180 460 | 5/1986 |
| EP | 0 332 707 | 9/1989 |
| EP | 0 651 554 | 5/1995 |
| EP | 0 668 695 | 8/1995 |
| EP | 0 725 376 | 8/1996 |
| EP | 1 191 422 A2 | 3/2002 |
| GB | 2 136 175 | 9/1984 |
| GB | 2 236 604 | 4/1991 |
| JP | 62-241061 | 10/1987 |
| JP | 64-068835 | 3/1989 |
| JP | 04-369068 | 12/1992 |
| JP | 05-268415 | 10/1993 |
| JP | 06-175794 | 6/1994 |

| | | |
|---|---|---|
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/10381 | 3/1998 |
| WO | WO 98/11690 | 3/1998 |
| WO | WO 98/42098 | 9/1998 |
| WO | WO 99/49615 | 9/1999 |
| WO | WO 01/63528 | 8/2001 |

OTHER PUBLICATIONS

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990. The Transactions of the IEICE, Vo. E 73, No. 7, Tokyo, JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionaize Software Pricing and Distribution; Wave Systems Corp.", pp. 1-3, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmell, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", pp. 1-24, 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publications", pp. 2-35, Feb. 8, 1995, Internet Dreams: Archetypes, Myths, and Metaphors.

Henry H. Perritt, Jr., "Technological Strategies for Protecting Intellectual Property in the Networked Multimedia Environment", Apr. 2-3, 1993, Knowbots, Permissions Headers & Contract Law.

International Search Report Date Mar. 6, 2003, for PCT/US02/14752.

METHOD AND APPARATUS FOR HIERARCHICAL ASSIGNMENT OF RIGHTS TO DOCUMENTS AND DOCUMENTS HAVING SUCH RIGHTS

RELATED APPLICATION DATA

This application is a continuation application of co-pending U.S. patent application Ser. No. 09/867,748 of Tadayon, et al. filed May 31, 2001, now U.S. Pat. No. 6,895,503 entitled "METHOD AND APPARATUS FOR HIERARCHICAL ASSIGNMENT OF RIGHTS TO DOCUMENTS AND DOCUMENTS HAVING SUCH RIGHTS," now allowed, which is related to U.S. patent application Ser. No. 09/867,746 of Tadayon, et al. filed May 31, 2001, entitled "METHOD AND APPARATUS FOR TRANSFERRING USAGE RIGHTS AND DIGITAL WORK HAVING TRANSFERRABLE USAGE RIGHTS," now pending; U.S. patent application Ser. No. 09/867,747 of Tadayon, et al. filed May 31, 2001, entitled "METHOD AND APPARATUS FOR ESTABLISHING USAGE RIGHTS FOR DIGITAL CONTENT TO BE CREATED IN THE FUTURE," now allowed; U.S. patent application Ser. No. 09/867,754 of Tadayon, et al. filed May 31, 2001, entitled "DEMARCATED DIGITAL CONTENT AND METHOD FOR CREATING AND PROCESSING DEMARCATED DIGITAL WORKS," now allowed; U.S. patent application Ser. No. 09/867,745 of Tadayon, et al. filed May 31, 2001, entitled "METHOD AND APPARATUS FOR DYNAMICALLY ASSIGNING USAGE RIGHTS TO DIGITAL WORKS," now U.S. Pat. No. 6,754,642; and U.S. patent application Ser. No. 09/867,749 of Tadayon, et al. filed May 31, 2001, entitled "METHOD AND APPARATUS FOR ASSIGNING CONDITIONAL OR CONSEQUENTIAL RIGHTS TO DOCUMENTS AND DOCUMENTS HAVING SUCH RIGHTS," now pending, the disclosures of all of which are incorporated herein by reference in their entirety.

BACKGROUND OF THE INVENTION

1. Field of the Invention

In general, the systems and methods of this invention relate to documents having associated rights. In particular, the systems and methods of this invention relate to documents having a hierarchical right structure and a system and method of assigning those rights.

2. Description of Related Art

Digital rights management (DRM) describes a process of attaching usage rights to a digital work, such as eContent, as well as managing and enforcing the same rights. In general, these digital works and eContent can include any type of content, such as music, books, multimedia presentations, eBooks, video information, or the like. In general, any information that is capable of being stored can be protected through the use of digital rights management. For example, a digital book could be accompanied by a license establishing conditions, such as viewing, printing, borrowing, or the like, governing the book's usage. These rights could then be controlled by, for example, an associated reader's software, and the allowable transactions, such as buying, printing, or the like, authorized by, for example, a clearinghouse.

One of the most important issues impeding the widespread distribution of digital works as documents via electronic means, such as the internet, is the lack of protection of intellectual property rights of content owners during the distribution, dissemination and use of those digital documents. Efforts to overcome this problem have been termed "intellectual property rights management" (IPRM), "digital property rights management" (DPRM), "intellectual property management" (IPM), "rights management" (RM) and "electronic copyright management" (ECM), which can be collectively referred to as Digital Rights Management (DRM). There are a number of issues in Digital Rights Management including authentication, authorization, accounting, payment and financial clearing, rights specifications, rights verification, rights enforcement, document protection, and the like.

In the world of printed documents, a work created by an author is typically provided to a publisher, which formats and prints numerous copies of the work. The copies are then distributed to bookstores or other retail outlets, from which the copies are purchased by end users. While the low quality of physical copying, and the high cost of distributing printed material have served as deterrents to unauthorized copying of most printed documents, digital documents allow easy copying, modification, and redistribution if they are unprotected. Accordingly, digital rights management allows the protecting of digital documents to, for example, complicate copying, modifying and redistributing.

Similarly, it has been widely recognized that it is difficult to prevent, or even deter, individuals from making unauthorized distributions of electronic documents within current general-purpose computer and communication systems such as personal computers, workstations, and other devices connected via a distributed network, such as a local area network, an intranet and the Internet. Many attempts to provide hardware-based solutions to prevent unauthorized copying have proven to be unsuccessful. Furthermore, the proliferation of broadband communications technologies and the development of the "national information infrastructure" (NII) will likely make it even more convenient to distribute large documents electronically, thus removing most deterrents to any unauthorized distribution of documents. Therefore, digital rights management technologies provide one method of protecting digital documents distributed electronically.

Two basic schemes have been employed to attempt to solve the document protection problem. In particular, the two basic schemes are secure containers and trusted systems. A secure container, or simply an encrypted document, offers one method of keeping document contents encrypted until a set of authorization parameters are satisfied. After the various parameters are verified, for example, by the document provider, the document can be released to a user. Commercial products such as IBM's Cryptolopes® and InterTrusts Digiboxes® fall into this category. While the secure container approach provides a solution to protect the document during delivery over unsecure channels, it does not provide any mechanism to prevent legitimate users from obtaining the unencrypted document, and then, for example, using and redistributing the unprotected document without authorization.

In the trusted system approach, the entire system that handles, for example, the distribution and viewing of a document, is responsible for preventing unauthorized use. Building such a trusted system usually entails introducing new hardware such as a secure processor, a secure storage, and secure rendering devices. The trusted system also requires that all software applications that run on the system be certificate to be trusted.

U.S. Pat. Nos. 5,530,235, 5,634,012, 5,715,403, 5,638,443 and 5,629,980, which are incorporated herein by reference in their entirety, generally discuss digital rights management. In general, an author creates a document and forwards it to a distributor for distribution. Typically, the author is the creator of the content, however, the author can be any one of the creator, the owner, the editor, or any other entity controlling a portion of content, or an agent of one of those entities. The author may distribute documents directly, without involving a secondary party such as a distributor. Therefore, the author and the distributor may be the same entity. A distributor can distribute documents to one or more users, for example, upon request. In a typical electronic distribution model, the content can be distributed as a document in encrypted form. For example, a distributor can encrypt the content with a random key, having encrypted the random key with a public key corresponding to one or more users. Thus, the encrypted document can be customized solely for a particular user. The user is then able to use the private key to unencrypt the public key and use the public key to unencrypt and view the document.

Payment for the document can be passed from a user to a distributor by way of a clearinghouse which can collect requests from one or more users who wish to view a particular document. The clearinghouse can also collect payment information, such as debit transactions, credit transactions, credit card transactions, or other known electronic payment schemes and forward the collected payments to a distributor. Furthermore, the clearinghouse may retain a share of the payment as a fee for these services. The distributor may also retain a portion of the payment from the clearinghouse to cover, for example, distribution services and royalties due an author.

Each time the user requests a document, an accounting message can be sent to an accounting server that can, for example, ensure that each request by the user matches a document sent by the distributor. Additionally, the accounting information can be received by an accounting server and distributor to reconcile any inconsistencies.

SUMMARY OF THE INVENTION

Expanding on the above concepts, it may be beneficial to have hierarchical rights assigned to one or more digital works. For example, a first user can be granted the right to use a document which may, for example, involve a fee, and in addition, the user has the right to transfer the same or different rights to a second user. Expanding further, the second user may also have the right to assign specified rights to a third user. In general, the hierarchical rights can be distributed in steps similar to a pyramid scheme or tree structure, and the assigned rights in each branch of the structure could be the same or different from those in any other branch. In general, the closer the user would be to the document author, the higher the authority and more rights the user would have access to. However, depending on the particular implementation, the content owner may want to deviate from the general rule by limiting the power or rights of one or more of the nodes near the root. For example, a publisher may want a distributor to distribute a book and grant the rights to read the book to an end user for a fee. However, the publisher may not want to provide the distributor with the right to read the book, unless, for example, the distributor also pays for a view right comparable to the end user. This hierarchical rights scheme can be used in the distribution chain from content owners to distributors, to secondary distributors, to end users, or the like. In general, hierarchical rights can be associated with any information by anyone or any entity.

Accordingly, aspects of the present invention relate to digital rights management. In particular, an exemplary embodiment of the invention provides for the management of hierarchical digital rights.

A further aspect of the invention provides users the ability to assign hierarchical rights, and the management of information having the associated hierarchical rights.

An additional aspect of the invention relates to determining a user's usage rights based on the hierarchical rights associated with the document.

An additional aspect of the invention relates to information having one or more associated hierarchical rights.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
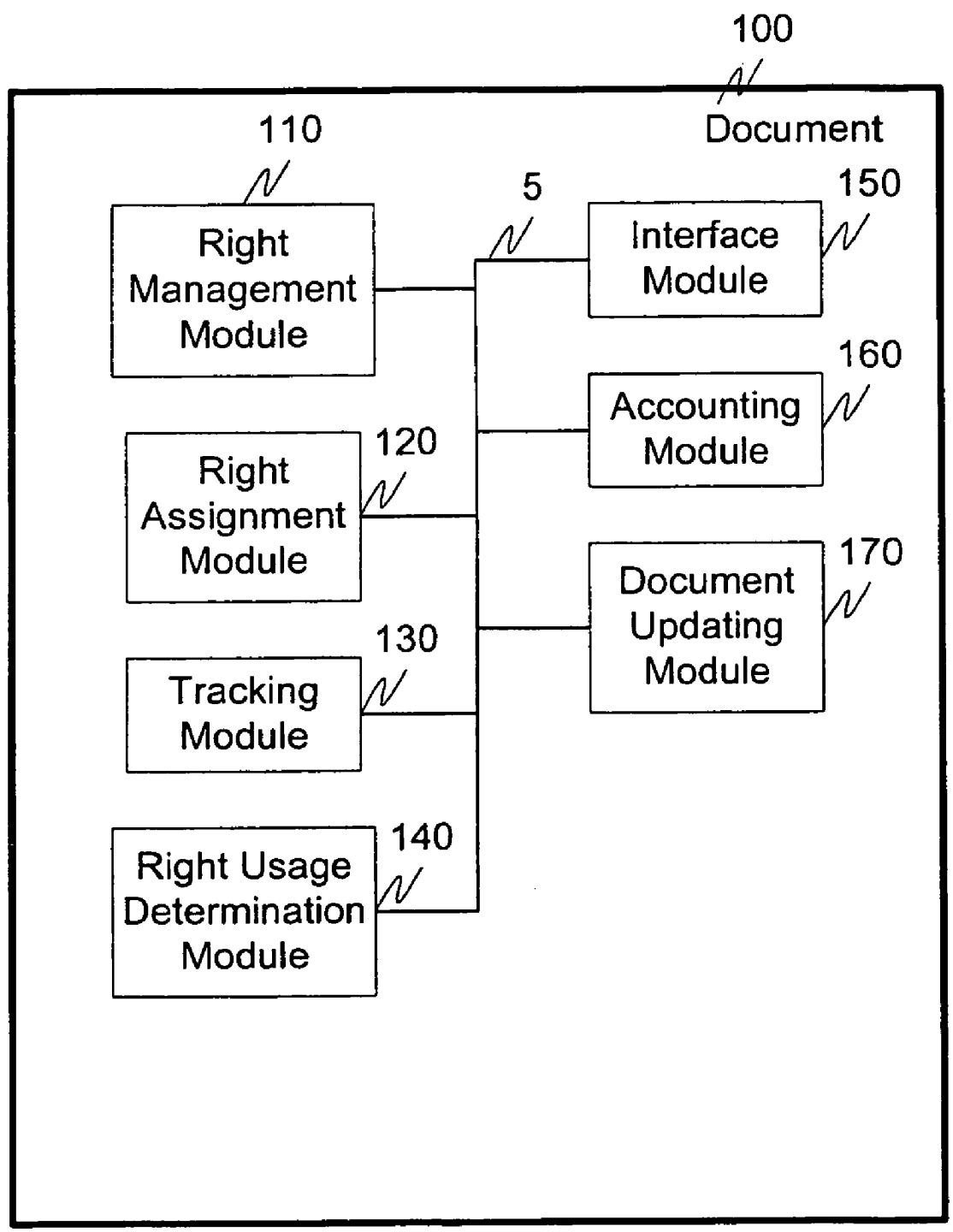
FIG. 1 is functional block diagram illustrating an exemplary document according to this invention.

The assignment of hierarchical rights allows, for example, even greater control by an author over one or more documents. This hierarchical rights assignment further allows for greater control throughout the document distribution chain extending to, for example, distributors, secondary distributors, users, or the like. Therefore, a graphical representation of the rights associated with the document could appear as a series of interconnected nodes each having an associated portion of rights.

An exemplary embodiment of the systems and methods of this invention can also include a rights-on-rights scheme in which, for example, a counter or other system manages the various layers, nodes and branches to regulate, for example, the rights to change, edit, assign, revoke, transfer other rights, or the like, to one or more additional layers. Since rights can be treated as an object class, for example using XML, rights can include themselves and thus refer to itself as, for example, an iteration. For example, a user can transfer the rights-on-rights for a maximum of two layers of the right assignment tree which could, for example, further limit and control the overall distribution of both the rights and the document. Therefore, the rights of the user may be different from the rights a user can assign or transfer in the hierarchical structure.

Additionally, for example, the rights to change, edit, copy, sign, or the like, can be passed on from the owner to the user. Associated with one or more of these rights can be document tracking actions. For example, using a digital signature, a document can manage and record its path of distribution, recording each user's interactivity with the document, including, for example, any assignment and/or distribution action, or any other information that may be relevant. Therefore, it is possible that a document will have associated therewith multiple signatures that represent, for example, a "snapshot" of the document as it was available to that particular user. For example, a second user can add, subtract, modify, edit, or the like, the content of a document which has already been signed by a first user. These modifications by the second user are then "signed," recording that user's interactions with the document. Both versions of the document then can be stored, for example, in a database, for reference, accounting, profiling, or the like.

Additionally, the right to use a document can be content-based or role-based, as is described in copending application Ser. No. 09/867,749 entitled "Method and Apparatus for Assigning Conditional or Consequential Rights to Documents and Documents Having Such Rights," filed herewith and incorporated herein by reference in its entirety. For example, the president of a company may want to be the only one authorized to use a particular document. If the present of the company changes, the new president can automatically become the right holder, assuming the president can verify, for example, their position using, for example, biometrics, a smart card, an identification card, or comparable identification device or scheme. This allows the assignment of rights to be separate from the assignment of the position.

Similarly, the systems and methods of this invention can be used in conjunction with rights editing tools and templates such as those discussed in U.S. Provisional Patent Application Ser. No. 60/261,753, entitled "Method and Apparatus for Editing and Specifying the Rights and Conditions Associated with Documents or Digital Contents," incorporated herein by reference in its entirety. For example, rights can be assigned through the use of templates that can aid in the assignment of rights to one or more classes of users based on, for example, a job position, a geographic location, a profile, an identifier, or the like.

Furthermore, this concept extends itself into the medical field. For example, where medical records are used by a doctor, the medical records can contain usage rights for a certain class or field of individuals. This can, for example, satisfy both the concerns regarding the patient's safety and the patient's privacy by limiting access to one or more documents.

Additionally, for example, the role-based or content-based rights can be used for access to movies with, for example, adult content to restrict a particular class of individuals from viewing the content. An attempt to access the restricted content can be recorded and, for example, reported to the proper party. Furthermore, the parent can be viewed as a node in the hierarchical right assignment structure such that the parent can obtain a template or toolkit for right assignment, right modification and right customization, and then transfer the rights to one or more children. The parent could then update and modify, for example using an age-based right assignment scheme with or without corresponding templates, the child's rights as, for example, the child grows.

FIG. 1 illustrates an exemplary document 100. The exemplary document 100 comprises a right management module 110, a right assignment module 120, a tracking module 130, a right usage determination module 140, an interface module 150, an accounting module 160, and a document updating module 170 interconnected by links 5. The document 100 can also be connected to a distributed network (not shown) which may or may not also be connected to one or more other documents, account processing systems, rights management systems, or other distributed networks, as well as one or more input devices and display devices (not shown).

While the exemplary embodiment illustrated in FIG. 1 shows the document 100 and associated components collocated, it is to be appreciated that the various components of the document 100 can be located at distant portions of a distributed network, such as a local area network, a wide area network, an intranet and/or the internet, or within a dedicated document or document system. Thus, it should be appreciated that the components of the document 100 can be combined into one device or collocated on a particular node of distributed network. Furthermore, it should be appreciated that for ease of illustration, the various functional components of the document 100 have been divided as illustrated in FIG. 1. However, any of the functional components illustrated in FIG. 1 can be combined or further partitioned without affecting the operation of the system. As will be appreciated from the following description, and for reasons of computation efficiency, the components of the document can be arranged at any location within a distributed network without effecting the operation of the system. Furthermore, it is to be appreciated that the term module as used herein includes any hardware and/or software that provide the functionality as discussed herein. Likewise, the document 100 can be self contained, such as an E-Book, and comprise any necessary controllers, memory, and/or I/O interfaces that may be necessary given the particular embodiment and/or implementation of the document 100. Additionally, the document 100 can be any information to which hierarchical rights are associated.

Furthermore, the links 5 can be a wired or wireless link or any other known or later developed element(s) that is capable of supplying and communicating data to and from the connected elements. Additionally, the input devices can include, for example, a keyboard, a mouse, a speech to text converter, a stylus, a mouse, or the like. In general, the input device can be any device capable of communicating information to the document 100. Furthermore, the display device can be a computer monitor, a display on a PDA, an E-Book, or any other device capable of displaying information to one or more users.

In operation, a user, such as a document creator, associates rights with the document 100. In particular, via the interface module 150 and one or more of an input device and display device, a user inputs rights to associate with the document 100. In cooperation with the right management module 110 and the right assignment module 120, the rights are associated with the document 100. In this exemplary embodiment, it is assumed that the content owner, or author, is not responsible for any type of accounting procedure, e.g., crediting or debiting, associated with assigning rights to the document 100. However, it is to be appreciated that for a particular embodiment, it may be desirable to credit or debit a user based on the user associating rights with a document 100. However, as previously discussed, the association and assignment of rights can be performed by, for example, one or more external rights assignment system that associates one or more hierarchical rights with the document 100.

For example, an employee of a newspaper may be hired to write an article on a particular topic. On completion of the article, the journalist could assigned view, edit and distribution rights to the publisher. Then, for example, upon assignment of these rights and distribution of the document to the publisher, the author could be credited for their work.

Alternatively, a user may receive a document 100 and wish to modify the rights associated with that document.

Thus, the right management module 110 determines the available assignable rights associated with the document 100. Then, via the interface module 150, and one or more of the input and display devices, the rights that are to be assigned by the user are received. Next, a determination is made by the right management module 110 as to whether the assignment is allowable. For example, the rights associated with the document 100 can restrict based on, for example, the user, the distribution history, another users' interaction with the document, or the like, whether the current user's request to modify the associated rights is allowable. If the right assignment module 120 determines that the user's request is not allowed, a message can be forwarded to the user indicating the like. However, if the assignment is determined allowable by the right assignment module 120, an optional determination can be made by the accounting module 160 as to whether any accounting functions need be performed. If accounting functions need be performed, the accounting module 160 can perform any necessary crediting and/or debiting as appropriate. For example, the accounting module 160 can contact an accounting system (not shown) which could authorize the user's transaction. Alternatively, for example, the accounting module 160 can interface with a user, for example, via a smart card, a credit card interface, or the like, and correctly debit and/or credit a user's account. However, it is to be appreciated that the accounting module 160 need not perform any function whatsoever if the rights associated with the document so specify, for example, in a document that is available for inspection and comment. Furthermore, it is appreciated that the accounting module 160 need not perform the accounting functions in real time, but can perform them on an as needed basis, in a batch, or the like. For example, if the document 100 is an E-Book, the accounting module 160 could debit every user that views the contents of the E-Book as it is passed around. Then, upon return of the E-Book to, for example, a library, the accounting module 160 can synchronize with, for example, an accounting system that performs any necessary accounting functions.

In general, if the accounting is required and is successful, the rights chosen by the user are associated with the document. However, if, for example, the accounting function is not allowed, a message can be forwarded to a user indicating that there is a problem.

After the association of the updated rights with the document by the document updating module 170, the tracking module 130 can optionally maintain a history, for example, with the use of a digital signature, of the rights updates, or any other updates, such as edits, or the like, made by this particular user. This information can then be associated with the document with the cooperation of the tracking module 130.

In use, a user receives one or more documents 100 for viewing, editing, modifying, updating, distributing, or the like. Upon receipt of the document 100, the right management module 110 determines the rights available to that user. If the user's usage request corresponds to the rights available to that user, the right usage determination module 140, in cooperation with the right management module 110, allows the user's request. Furthermore, based on the user's usage request, the document updating module 170 can allow the user to, for example, edit, update, or otherwise modify the document 110.

However, if the user's usage request does not correspond to the usage rights available to that user, a message can be forwarded to the user requesting, for example, an alternative usage request be entered, or denying access to the document.

Optionally, the tracking module 130 can also maintain a log of user access attempts and rights requests for the document.

Figure 2:
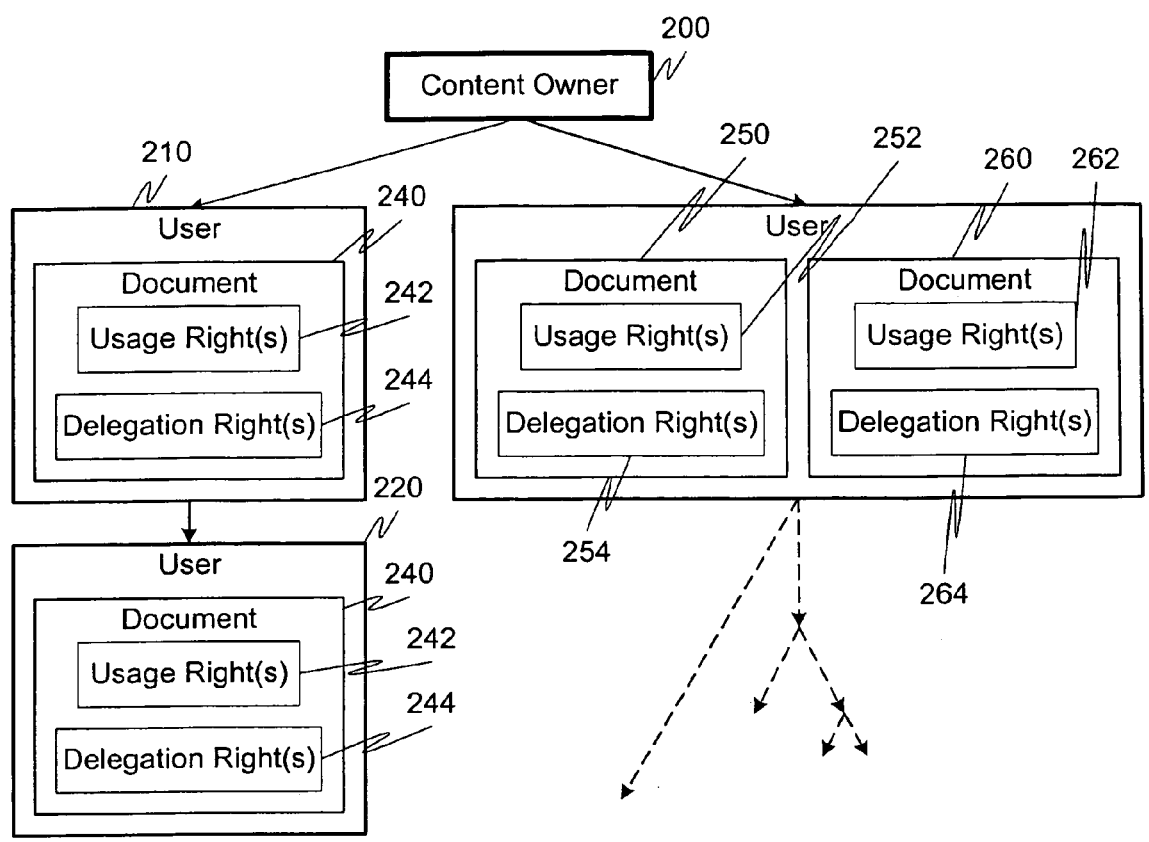
FIG. 2 is a diagram illustrating an exemplary embodiment of the distribution of documents having associated hierarchical rights according to this invention.

FIG. 2 illustrates an exemplary tree of documents having associated hierarchical rights at each node of the tree. In particular, a user, such as a content owner 200, distributes one or more documents to users 210, 220 and 230. The documents 240, 250 and 260, respectively, comprise usage rights and delegation rights. The usage rights govern the extent to which the user can access the particular document. The delegation rights govern the ability for the user to assign rights, govern further distribution the document, and regulate the number of users to which the document can be distributed. In this exemplary embodiment, the content owner 200 distributes a first document to the user 210 who then distributes the document 240 to user 220. Additionally, the content owner distributes documents 250 and 260 to the user 230.

In this exemplary embodiment, the user 210, based on the delegation rights 244, has the ability to further distribute the rights to one or more additional users. In this example, the user 210 distributes the document 240 to user 220. Therefore, the user 220 will have a version of the document 240 that has associated usage rights 242 and delegation rights 244. These usage rights 242 and delegation rights 244 may be a subset of, or may comprise additional rights not present in the usage rights and/or delegation rights granted to the user 210.

User 230 possesses two documents 250 and 260. The document 250 comprises associated usage rights 252 and delegation rights 254. Likewise, the document 260 comprises usage rights 262 and delegation rights 264. The user 230 then has the ability, based on the available rights, to modify one or more of the usage rights and/or delegation rights and forward them to one or more additional parties. In this manner, a hierarchical structure of usage rights and delegation rights extends from the content owner in a tree-like structure through one or more users.

Figure 3:
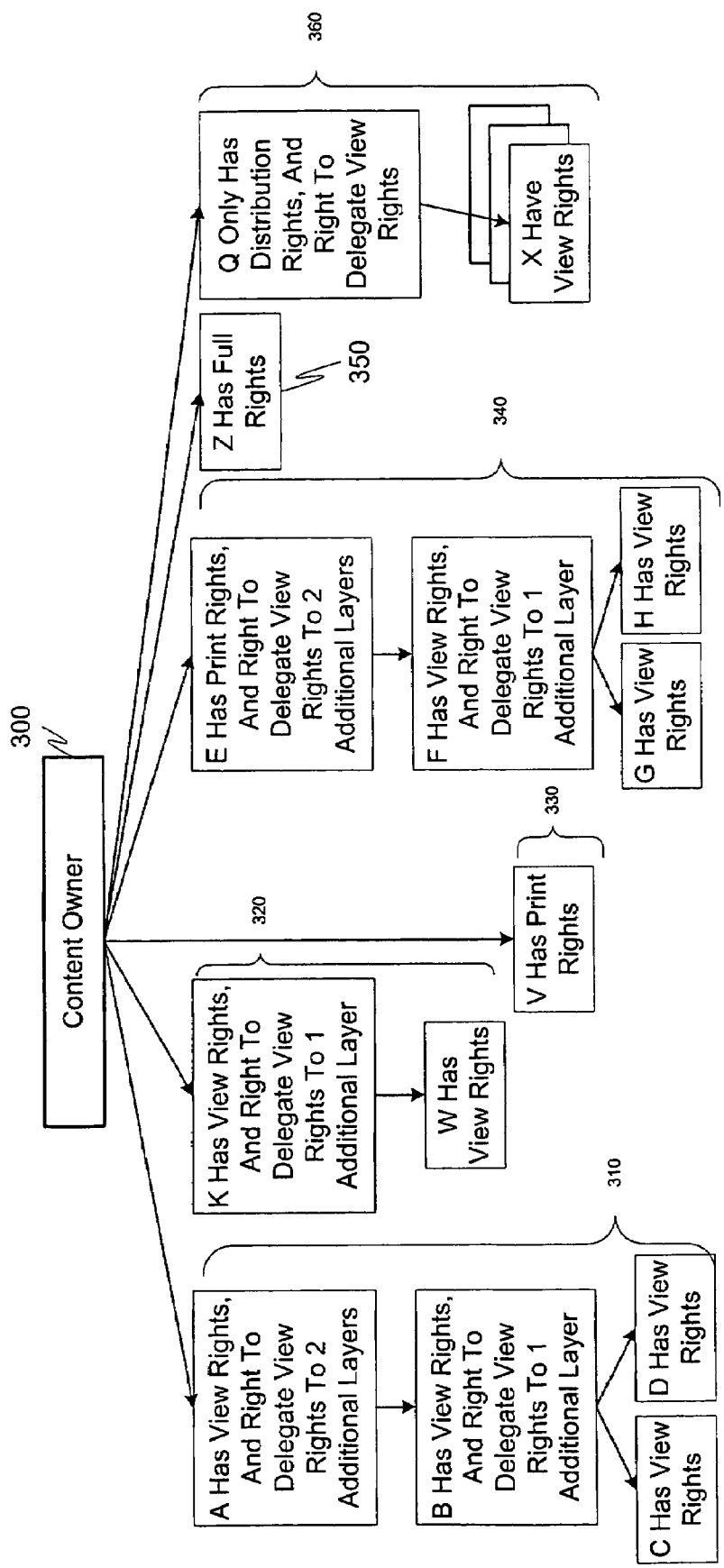
FIG. 3 is a second diagram illustrating an exemplary embodiment of the distribution of documents having associated hierarchical rights according to this invention.

FIG. 3 illustrates various exemplary embodiments of usage rights and delegation rights associated with an exemplary document. In particular, content owner 300 distributes six documents 310–360. Document 310 allows user A to have view rights and the right to delegate view rights to two additional layers. User B has view rights and the right to delegate view rights to two users on one additional layer. Users C and D both have view rights granted by user B, but no delegation rights.

Document 320 allows user K to have view rights and the right to delegate view rights to one additional layer. Upon granting of these view rights, user W has view rights to the document.

For document 330, the content owner 300 granted user V a print usage right, and no delegation rights. Thus, the document 330 cannot be further delegated and may, for example, become inaccessible after V has exercised the print right.

Document 340 provides user E print rights, and the right to delegate view rights to two additional layers. Upon delegation of these rights, user F has view rights and the right to delegate view rights to two additional users on one further layer. Upon delegation of these rights, users G and H would both be able to view the document 340.

For document 350, the content owner 300 has provided user Z with full rights. Thus, user Z has the ability to assign any delegation and/or usage rights to the document 350. Thus, the document 350 can be further distributed and/or used based on the updated rights based on the rights user Z associates with the document.

Document 360 allows user Q to have distribution rights to unlimited users, and the ability to delegate view rights to each of these users. Thus, user Q can delegate view rights to one or more users X who can view the document, for example, on a pay-per-view basis.

While the exemplary embodiment illustrated in FIG. 3 shows specific usage rights and delegation rights, it is to be appreciated that any usage rights, such as editing, modifying, updating, copying, viewing, or the like, can be associated with one or more documents. Furthermore, it is to be appreciated that the rights associated with a document can include accounting rights, conditional or consequential rights, return rights, tracking rights, signature requirement rights, or the like. In general, the rights associated with a document can be any right granting or restricting access to one or more users, and can encompass at least all the rights specified in the XrML™ rights language and the associated usage rights and grammar.

Figure 4:
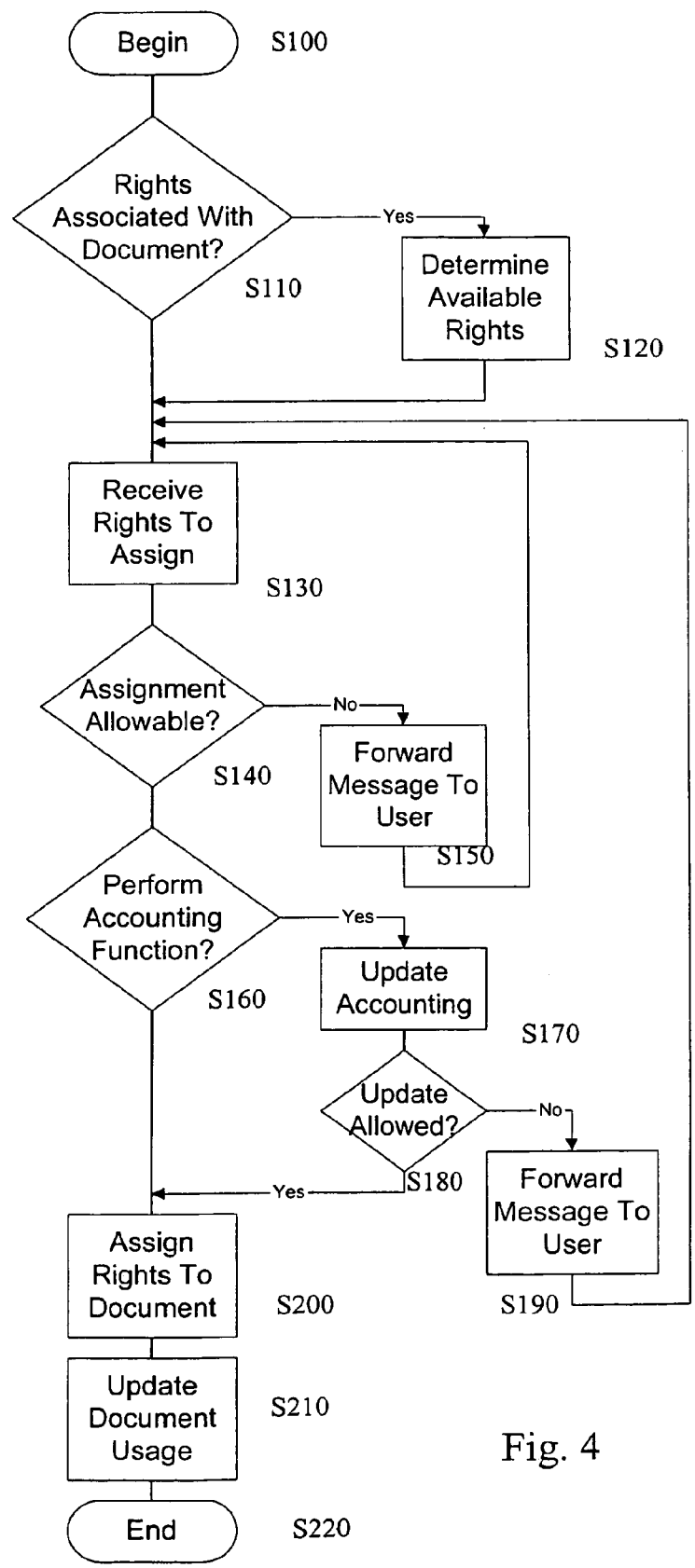
FIG. 4 is a flow chart outlining an exemplary method of associating rights with a document according to this invention.

FIG. 4 illustrates an exemplary embodiment of a method for associating rights with a document. In particular, control begins in step S100 and continues to step S110. In step S110, a determination is made whether rights are already associated with the document. If rights are associated with the document, control continues to step S120 where the usage and delegation rights available to the particular user are determined. Control then continues to step S130.

In step S130, the rights one or more users desire to have associated with the document are received. Next, in step S140, it is determined whether the assignment of these rights is allowable. If the assignment is allowable, control continues to step S160. Otherwise, control jumps to step S150. In step S150, a message can be forwarded to the user indicating the assignment is not available. Control then optionally continues back to step S130.

In step S160, an optional accounting function can be performed. If accounting is necessary, control continues to step S170. Otherwise, control jumps to step S200.

In step S170, any necessary accounting functions are attempted. Then, in step S180, a determination is made whether the accounting, e.g., any crediting and/or debiting, is allowed. If the accounting functions are successful, control jumps to step S200. Otherwise, control continues to step S190 where a message can be forwarded to the user and control returns back to step S130.

In step S200, the right as chosen by the one or more users are associated with the document. Then, in step S210, the document can be updated reflecting, for example, which usage rights were used, the effect of any of these usage rights, a signature of the user and, for example, any modifications to or assignment of delegation rights. Control then continues to step S200 where the control sequence ends.

Figure 5:
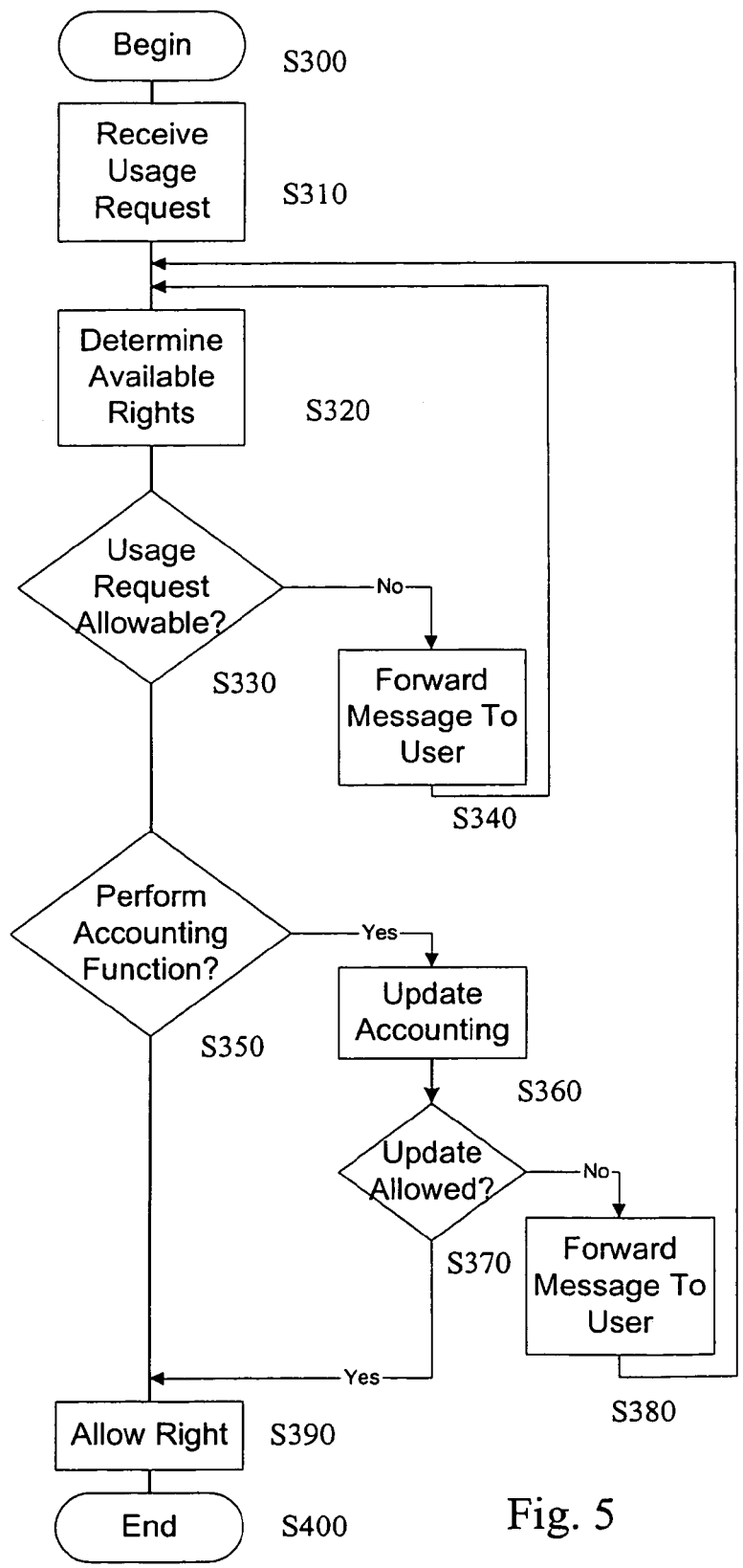
FIG. 5 is a flow chart outlining an exemplary method of using hierarchical rights according to this invention.

FIG. 5 illustrates an exemplary method of using one or more of usage rights and delegation rights. In particular, control begins in step S300 and continues to step S310. In step S310, the usage request is received. This usage request can be one or more of a usage right requests or a delegation right request. Then, in step S320, the rights available to the particular user are determined. For example, as previously discussed, the rights can be based on the identity of the user, the position of the user, a status of the user, or the like. Control then continues to step S330.

In step S330, a determination is made whether the user's right request is allowable. If the usage request is not allowable, control continues to step S340. Otherwise, control jumps to step S350.

In step S340, a message can be forwarded to the user indicating the requested usage, i.e., the usage or the delegation request, is not allowable. Control then optionally jumps back to step S320.

In step S350, a determination is made whether an accounting function is to be performed based on, for example, the usage request or the delegation request. If accounting functions are to be performed, control continues to step S360. Otherwise, control jumps to step S390.

In step S360, the accounting functions are attempted. Then, in step S370, a determination is made whether the accounting functions are allowed. If the accounting functions are allowed, control continues to step S380. Otherwise, control jumps to step S390.

In step S380, a message can be forwarded to the user indicating, for example, that the crediting and/or debiting authorization failed. Control then can, for example, jump back to step S320 or, optionally, the user can be prompted for additional accounting information.

In step S390, one or more of the usage rights or delegation rights is allowed. Control then continues to step S400, where the control sequence ends.

As illustrated in FIG. 1, the document can be implemented either on a single programmed general purpose computer or a separate programmed general purpose computer. However, the document can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device capable of implementing a finite state machine that is in turn capable of implementing the flowcharts in FIGS. 4–5 can be used to implement the document and hierarchical rights management system according to this invention.

Furthermore, the disclosed method may be readily implemented in software using object or object-oriented software development environments that provide portable source code that can be used on a variety of computer or workstation hardware platforms. Alternatively, the disclosed document and right management system may be implemented partially or fully in hardware using standard logic circuits or VLSI design. Whether hardware or software is used to implement the systems and methods in accordance with this invention is dependent on the speed and/or efficiency requirements of the system, the particular function, and a particular software and/or hardware systems or microprocessor or microcomputer systems being utilized. The document and rights management systems illustrated herein, however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor or the like. In these instances, the methods and systems of this invention can be implemented as a program embedded in a personal computer, an E-Book, a secure container, or the like, such as a Java® or CGI script, as an XML document, as a resource residing on a server or graphics workstation, as a routine embedded in a dedicated electronic document, an electronic document viewer, or the like. The document and rights management system can also be implemented by physically incorporating the systems and methods into a hardware and/or software system, such as the hardware and software systems of a computer or dedicated electronic document.

It is, therefore, apparent that there has been provided, in accordance with the present invention, systems and methods for managing electronic documents. While this invention has been described in conjunction with a number of embodiments, it is evident that many alternatives, modifications and variations would be or are apparent to those of ordinary skill in the applicable art. Accordingly, applicants intend to embrace all such alternatives, modifications and variations that are within the spirit and scope of this invention.

What is claimed is:

1. A method for transferring usage rights associated with digital works, the method comprising:
   generating, by a first party, first usage rights and hierarchical rights for a digital work, the first usage rights defining a use for the digital works, the first hierarchical rights specifying rights to derive usage rights or other hierarchical rights;
   presenting the first usage rights and hierarchical rights to a second party;
   receiving a selection from the second party indicating desired rights of the first usage rights and hierarchical rights; and
   granting the desired rights of the first usage rights and hierarchical rights to the second party.

2. The method of claim 1, further comprising specifying one or more conditions which must be satisfied in order for the first usage rights to be exercised and one or more conditions which must be satisfied in order for the first hierarchical rights to be exercised.

3. The method of claim 1, further comprising receiving a request for at least one of the first usage rights and hierarchical rights from the second party.

4. The method of claim 1, further comprising:
   receiving a request generated by a third party for at least one of the first usage rights and hierarchical rights for the digital works;
   generating, by the second party, second rights derived from the first hierarchical rights.

5. The method of claim 1, wherein the digital work comprises content.

6. The method of claim 5, wherein the content includes at least one of E-Books, books, documents, music, audio information, multimedia presentations and video information.

7. The method of claim 1, wherein the first party includes a provider, distributor, retailer, or a user of the digital work.

8. The method of claim 1, wherein the second party includes a provider, distributor, retailer, or a user of the digital work.

9. The method of claim 1, further comprising:
   collecting usage rights and hierarchical rights available to be offered as the first usage rights and hierarchical rights;
   determining if the first party has a right to offer the first usage rights and hierarchical rights to the second party;
   terminating any offers, if the right to offer the first usage and hierarchical rights does not exist; and
   offering the available rights, if the right to offer the first usage and hierarchical rights does exist.

10. The method of claim 1, wherein the usage rights specify rights to copy, transfer, print, edit, modify, update, play, execute or view the digital work.

11. The method of claim 1, the method being for generating rights for digital works to be used within a system for at least one of managing use and distribution of the digital works, the method further comprising:
    permitting the second party to exercise the selected hierarchical rights and to offer at least one derived right derived from a selected hierarchical right to a third party.

12. The method of claim 11, wherein the at least one derived right includes usage rights to be exercised by the third party and hierarchical rights permitting derived rights to be offered to a fourth party.

13. The method of claim 1, wherein the method is implemented as one or more computer readable instructions embedded on a computer readable medium and configured to cause one or more computer processors to perform the steps recited in the method.

14. The method of claim 1, wherein the method is implemented as one or more computer software and/or hardware devices configured to perform the steps recited in the method.

15. A system for transferring usage rights associated with digital works, the system comprising:
    means for generating, by a first party, first usage rights and hierarchical rights for a digital work, the first usage rights defining a use for the digital works, the first hierarchical rights specifying rights to derive usage rights or other hierarchical rights;
    means for presenting the first usage rights and hierarchical rights to a second party;
    means for receiving a selection from the second party indicating desired rights of the first usage rights and hierarchical rights; and
    means for granting the desired rights of the first usage rights and hierarchical rights to the second party.

16. The system of claim 15, further comprising means for specifying one or more conditions which must be satisfied in order for the first usage rights to be exercised and one or more conditions which must be satisfied in order for the first hierarchical rights to be exercised.

17. The system of claim 15, further comprising means for receiving a request for at least one of the first usage rights and hierarchical rights from the second party.

18. The system of claim 15, further comprising:
    means for receiving a request generated by a third party for at least one of the first usage rights and hierarchical rights for the digital works;
    means for generating, by the second party, second rights derived from the first hierarchical rights.

19. The system of claim 15, wherein the digital work comprises content.

20. The system of claim 19, wherein the content includes at least one of E-Books, books, documents, music, audio information, multimedia presentations and video information.

21. The system of claim 15, wherein the first party includes a provider, distributor, retailer, or a user of the digital work.

22. The system of claim 15, wherein the second party includes a provider, distributor, retailer, or a user of the digital work.

23. The system of claim 15, further comprising:
    means for collecting usage rights and hierarchical rights available to be offered as the first usage rights and hierarchical rights;

means for determining if the first party has a right to offer the first usage rights and hierarchical rights to the second party;
means for terminating any offers, if the right to offer the first usage and hierarchical rights does not exist; and
means for offering the available rights, if the right to offer the first usage and hierarchical rights does exist.

24. The system of claim 15, wherein the usage rights specify rights to copy, transfer, print, edit, modify, update, play, execute or view the digital work.

25. The system of claim 15, wherein the system is implemented as one or more computer software and/or hardware devices.

26. A device for transferring usage rights associated with digital works, the device comprising:
means for receiving from a first party first usage rights and hierarchical rights for a digital work, the first usage rights defining a use for the digital works, the first hierarchical rights specifying rights to derive usage rights or other hierarchical rights;
means for indicating desired rights of the first usage rights and hierarchical rights; and
means for receiving a grant of the desired rights of the first usage rights and hierarchical rights.

27. The device of claim 26, wherein one or more conditions which must be satisfied in order for the first usage rights to be exercised and one or more conditions which must be satisfied in order for the first hierarchical rights to be exercised are specified.

28. The device of claim 26, further comprising means for sending a request for at least one of the first usage rights and hierarchical rights.

29. The device of claim 26, further comprising:
receiving a request generated by a second party for at least one of the first usage rights and hierarchical rights for the digital works;
generating second rights derived from the first hierarchical rights.

30. The device of claim 26, wherein the digital work comprises content.

31. The device of claim 30, wherein the content includes at least one of E-Books, books, documents, music, audio information, multimedia presentations and video information.

32. The device of claim 26, wherein the first party includes a provider, distributor, retailer, or a user of the digital work.

33. The device of claim 26, wherein the device is associated with a provider, distributor, retailer, or a user of the digital work.

34. The device of claim 26, further comprising:
means for collecting usage rights and hierarchical rights available to be offered as the first usage rights and hierarchical rights;
means for determining if the first party has a right to offer the first usage rights and hierarchical rights;
means for terminating any offers, if the right to offer the first usage and hierarchical rights does not exist; and
means for offering the available rights, if the right to offer the first usage and hierarchical rights does exist.

35. The device of claim 26, wherein the usage rights specify rights to copy, transfer, print, edit, modify, update, play, execute or view the digital work.

36. The device of claim 26, the device being for generating rights for digital works to be used within a system for at least one of managing use and distribution of the digital works, the device further comprising:
means for receiving permission to exercise the selected hierarchical rights and to offer at least one derived right derived from a selected hierarchical right to a second party.

37. The device of claim 36, wherein the at least one derived right includes usage rights to be exercised by the device and hierarchical rights permitting derived rights to be offered to the second party.

38. The device of claim 26, wherein the device is implemented as one or more computer software and/or hardware components.

39. A method for transferring rights associated with digital works, the method comprising:
generating hierarchical rights;
including in the hierarchical rights at least one node;
including in each node at least one right;
associating the hierarchical rights to a digital work; and
granting the hierarchical rights and one or more of the rights of the nodes to a second party.

40. The method of claim 39, further comprising including in each node the at least one right comprising one or more usage rights and/or transfer or delegation rights.

41. The method of claim 39, wherein the method is implemented as one or more computer readable instructions embedded on a computer readable medium and configured to cause one or more computer processors to perform the steps recited in the method.

42. The method of claim 39, wherein the method is implemented as one or more computer software and/or hardware devices configured to perform the steps recited in the method.

43. A system for transferring rights associated with digital works, the system comprising:
means for generating hierarchical rights;
means for including in the hierarchical rights at least one node;
means for including in each node at least one right;
means for associating the hierarchical rights to a digital work; and
means for granting the hierarchical rights and one or more of the rights of the nodes to a second party.

44. The system of claim 43, further comprising means for including in each node the at least one right comprising one or more usage rights and/or transfer or delegation rights.

45. The system of claim 43, wherein the system is implemented as one or more computer software and/or hardware devices.

46. A device for transferring rights associated with digital works, the device comprising:
means for receiving hierarchical rights, the hierarchical rights including in at least one node, each node including at least one right, the hierarchical rights associated with a digital work; and
means for receiving a grant of the hierarchical rights and one or more of the rights of the nodes.

47. The device of claim 46, wherein each node includes the at least one right comprising one or more usage rights and/or transfer or delegation rights.

48. The device of claim 46, wherein the device is implemented as one or more computer software and/or hardware components.

49. A method for transferring usage rights adapted to be associated with digital works, the method comprising:
generating, by a first party, first usage rights (A) and first hierarchical rights (B) for a digital work, the first usage rights (A) defining a use for the digital works by a second party, the first hierarchical rights (B) specifying usage rights and/or hierarchical rights that the second party can extend to a third party; and granting a desired exercise of the first usage rights (A) and/or hierarchical rights (B) to the second party.

50. The method of claim 49, further comprising specifying one or more conditions which must be satisfied in order for the first usage rights to be exercised and/or one or more conditions which must be satisfied in order for the first hierarchical rights to be exercised.

51. The method of claim 49, further comprising:

receiving a request generated by a third party for at least one of the first usage rights and/or first hierarchical rights for the digital works; and generating, by the second party second usage rights and/or hierarchical rights derived from the first hierarchical rights.

52. The method of claim 49, further comprising:

presenting the first usage rights (A) and hierarchical rights (B) to the second party; and receiving a selection from the second party indicating desired rights of the first usage rights and/or hierarchical rights.

53. The method of claim 52, the method being for generating rights for digital works to be used within a system for at least one of managing use and distribution of the digital works, the method further comprising:

permitting the second party to exercise the selected hierarchical rights and/or to offer at least one derived right derived from a selected hierarchical right to a third party.

54. The method of claim 53, wherein the at least one derived right includes usage rights to be exercised by the third party and/or hierarchical rights permitting derived rights to be offered to a fourth party.

55. The method of claim 49, wherein the method is implemented as one or more computer readable instructions embedded on a computer readable medium and configured to cause one or more computer processors to perform the steps recited in the method.

56. The method of claim 49, wherein the method is implemented as one or more computer software and/or hardware devices configured to perform the steps recited in the method.

57. A system for transferring usage rights adapted to be associated with digital works, the method comprising:

means for generating, by a first party, first usage rights (A) and first hierarchical rights (B) for a digital work, the first usage rights (A) defining a use for the digital works by a second party, the first hierarchical rights (B) specifying usage rights and/or hierarchical rights that the second party can extend to a third party; and means for granting a desired exercise of the first usage rights (A) and/or hierarchical rights (B) to the second party.

58. The system of claim 57, further comprising means for specifying one or more conditions which must be satisfied in order for the first usage rights to be exercised and/or one or more conditions which must be satisfied in order for the first hierarchical rights to be exercised.

59. The system of claim 57, further comprising:

means for receiving a request generated by a third party for at least one of the first usage rights and/or first hierarchical rights for the digital works; and means for generating, by the second party second usage rights and/or hierarchical rights derived from the first hierarchical rights.

60. The system of claim 57, further comprising:

means for presenting the first usage rights (A) and hierarchical rights (B) to the second party; and means for receiving a selection from the second party indicating desired rights of the first usage rights and/or hierarchical rights.

61. The system of claim 60, the system being for generating rights for digital works and for at least one of managing use and distribution of the digital works, the system further comprising:

means for permitting the second party to exercise the selected hierarchical rights and/or to offer at least one derived right derived from a selected hierarchical right to a third party.

62. The system of claim 61, wherein the at least one derived right includes usage rights to be exercised by the third party and/or hierarchical rights permitting derived rights to be offered to a fourth party.

63. The system of claim 57, wherein the system is implemented as one or more computer software and/or hardware devices.

64. A device for transferring usage rights adapted to be associated with digital works, the method comprising:

means for receiving first usage rights (A) and first hierarchical rights (B) for a digital work, the first usage rights (A) defining a use for the digital works, the first hierarchical rights (B) specifying usage rights and/or hierarchical rights that can be extended to a party; and means for receiving a grant of a desired exercise of the first usage rights (A) and/or hierarchical rights (B).

65. The device of claim 64, further comprising means for specifying one or more conditions which must be satisfied in order for the first usage rights to be exercised and/or one or more conditions which must be satisfied in order for the first hierarchical rights to be exercised.

66. The device of claim 64, further comprising:

means for receiving a request for at least one of the first usage rights and/or first hierarchical rights for the digital works; and means for generating, second usage rights and/or hierarchical rights derived from the first hierarchical rights.

67. The device of claim 64, further comprising:

means for receiving a selection indicating desired rights of the first usage rights and/or hierarchical rights.

68. The device of claim 64, wherein the device is implemented as one or more computer software and/or hardware components.

* * * * *